No. 800,556. PATENTED SEPT. 26, 1905.
P. T. DODGE.
LINOTYPE MACHINE.
APPLICATION FILED MAY 19, 1905.
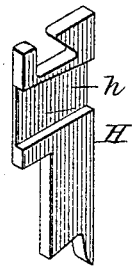
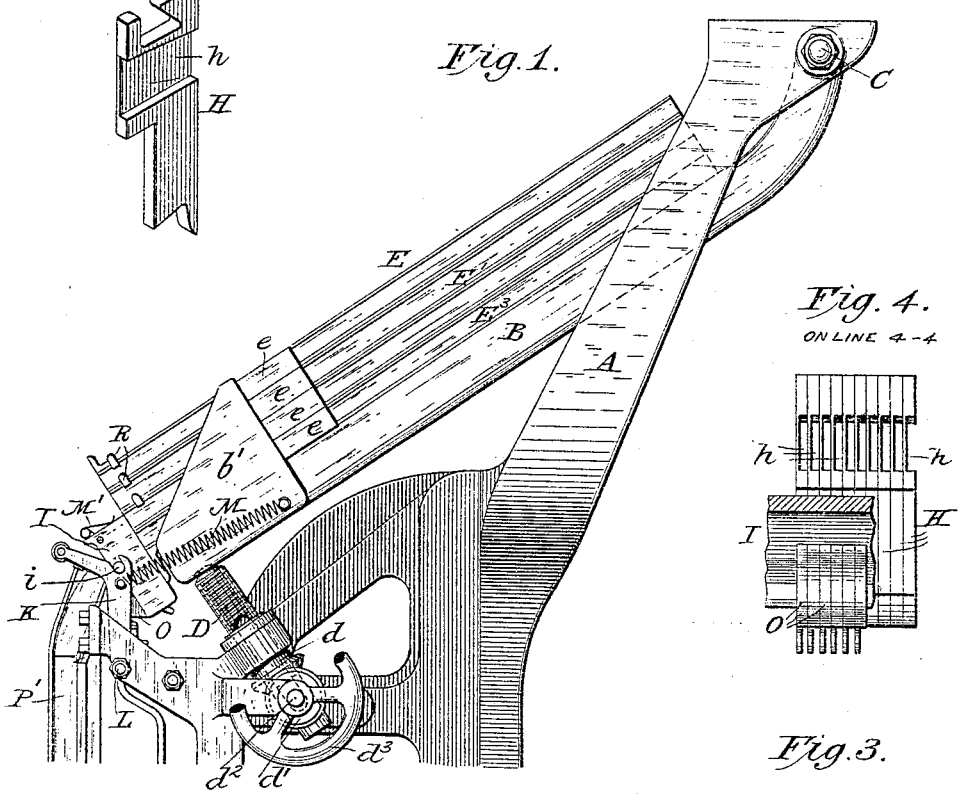
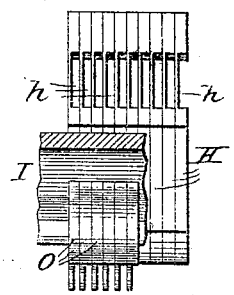
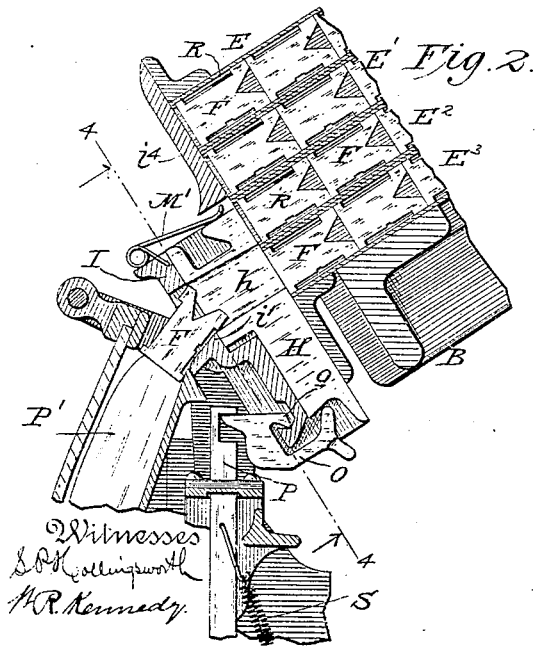
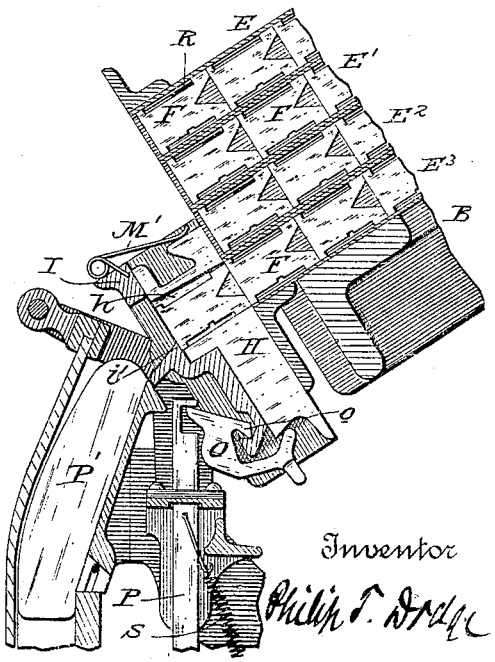

UNITED STATES PATENT OFFICE.

PHILIP T. DODGE, OF BROOKLYN, NEW YORK, ASSIGNOR TO MERGENTHALER LINOTYPE COMPANY, A CORPORATION OF NEW YORK.

LINOTYPE-MACHINE.

No. 800,556.          Specification of Letters Patent.          Patented Sept. 26, 1905.

Application filed May 19, 1905. Serial No. 261,171.

*To all whom it may concern:*

Be it known that I, PHILIP T. DODGE, of Brooklyn, county of Kings, and State of New York, have invented a new and useful Improvement in Linotype-Machines, of which the following is a specification.

My invention has reference to a linotype-machine in which a series of parallel magazines or magazine-sections each adapted to carry a complete font or set of matrices are connected and mounted in such manner that either section may be brought at will into operative relation to the escapement devices for discharging the matrices.

It consists in an improved manner of sustaining and adjusting the magazines, in the manner of supporting and adjusting the coöperating escapement mechanism, and in improved details of the escapement devices.

With the exception of the parts herein shown and described the machine may be of any ordinary or suitable construction.

Referring to the drawings, Figure 1 is a side elevation of the magazine, the upper portion of the main frame, and the coöperating parts. Figs. 2 and 3 are longitudinal vertical sections through the forward end of the same. Fig. 4 is a section on the line 4 4 of Fig. 2. Fig. 5 is a perspective view of one of the escapements.

Referring to the drawings, A represents a main frame, which may be of any form adapted to sustain the operative parts.

B is an inclined base-frame for the magazine, mounted at its upper end on a horizontal rod or pivot C, seated in the top of the main frame, the arrangement being such as to permit the frame B to swing upward and downward at its lower end. At its lower end the frame B is supported on one or more adjusting-screws D, seated in the main frame. I prefer to employ two non-rotating screws passing through nuts $d$, seated in the main frame and each operated by a pinion $d'$ on a horizontal shaft $d^2$, seated in the main frame and provided with a hand-wheel $d^3$. This shaft may be extended, as shown, through a transverse slot in the screw, whereby the rotation of the screw is prevented. The turning of the hand-wheel serves to rotate the nut, and thereby raise or lower the end of the frame B.

The magazine consists of a series of sections E E', &c., lying one upon another, the whole series removably seated upon the underlying frame B. To keep the magazines in position and permit their convenient removal, the frame B is provided on each side with an upright cheek-plate $b'$ to bear against the lower ends of the projections $e$ on the edges of the magazines. With this arrangement the magazines, which will be laid loosely together, tend to slide downward in an endwise direction, and the projections $e$, bearing against the plates $b'$, will hold their lower ends in line and in proper operative relations.

The frame B serves, it will be seen, not only to support the multiple magazine, but also to raise and lower it, so that the lower end of either section may be brought in operative relation to the escapement devices.

The magazines are grooved or channeled internally to receive and guide the upper and lower edges of the matrices F, as in the ordinary Mergenthaler linotype-machine.

The escapement mechanism consists of a series of upright slides H, equal in number to the channels in one magazine. These slides are mounted to move upward and downward side by side in a supporting-bar I, which extends horizontally across the lower end of the magazine, its ends being sustained by trunnions $i$ in the upper end of a vibrating frame K, sustained at its lower end by pivots L in the main frame. The escapement-slides H have their upper edges exposed directly against the lower end of the magazine. In order to keep the bar I and the contained slides in operative relation to the magazine, a spring M is extended from the rocking frame K to the magazine-frame, as shown in Fig. 1, its effect being to maintain close connection between the bar I and the end of the magazine, while at the same time permitting the bar to rock or tilt slightly that it may adjust itself to the varying angle or inclination which the end of the magazine assumes as it is swung upward and downward. Each of the slides H is formed in its side face with a transverse groove or channel $h$, forming a continuation of the adjacent channel in the magazine, so that when the slide is lowered to the position shown in Fig. 3 the foremost matrix may advance from the magazine into the slide the width of which is equal to the length of the matrix.

The escapement-supporting bar I, commonly known as the "escapement-bar," is formed at the front with openings through which the matrices may pass from the escapement-slides. The bar is formed, as shown, with shoulders $i''$, standing at such height that when the matrices enter from the magazine their forward ends abut against the shoulders, by which their further advance is prevented. The discharge of a matrix is effected by lifting the slide from its receiving position, Fig. 3, to the position shown in Fig. 2, the effect being to lift the contained matrix above the shoulder $i''$, over which it passes endwise.

During the rise of the matrix to the discharging level its upper or rear end bears against and holds back the next matrix in the magazine until it is engaged, as shown in Fig. 2, by the escapement-slide, which prevents its advance when the first matrix is released. When the slide falls to its original position, the next matrix in turn advances from the magazine into the escapement-slide and is arrested by the shoulder $i''$.

It will be seen that in the normal position of the parts the matrices are contained wholly within the magazine and that the escapement devices are empty. The advantage of this construction lies in the fact that the end of the magazine may be moved upward and downward at any time in order to bring the required section into action, and this without returning or restoring to the magazine matrices which have passed therefrom into the escapement devices. In all escapement mechanisms heretofore employed in connection with a movable magazine one or more matrices have been retained at all times in the escapement mechanism and the magazine cannot be moved until the matrices have been restored thereto, an operation involving both considerable time and effort.

The escapement may be modified in form and arrangement, provided it retains essentially the mode of action above described—that is to say, provided it is adapted to coöperate with the magazine and normally hold within the same all matrices which have not been permitted to pass to the line.

The slides H may be supported and actuated in any suitable manner. I prefer to effect their depression by springs M', secured to the escapement-bar I and bearing on the upper ends of the respective slides, as shown.

In order to maintain the slides in their normal elevated positions, (shown in Fig. 2,) I have provided angular levers O, having midway their length lips $o$, which are seated in bearings formed in the bar I. These levers are adapted to bear at their rear ends upward against the under ends of the escapement-slides H, while their forward ends are adapted to be engaged by the vertically-sliding reeds or bars P, connecting with the finger-keys and acted upon by springs S of strength sufficient to overcome the springs M. It will be observed that the levers O are adapted to be slipped into their places and to be removed therefrom at will. They are advantageous, in that they avoid the necessity for pivot-pins, each lever being free for removal or insertion independently of the others.

I believe myself to be the first to combine with an inclined magazine wherein the matrices slide on edge an escapement device constructed to act when in one position as a continuation of the magazine-channel to receive and support a single matrix, bearing at its end against a fixed stop, and also serving when moved to another position to lift the contained matrix clear of the detaining-shoulder and at the same time hold back the next succeeding matrix. The details may be varied, provided this mode of action is retained.

The matrices discharged from the escapement devices are received in the vertically-channeled front or guide P', through which they descend to the usual devices by which they will be assembled in line, as in the ordinary linotype-machine. The matrices may be held back in those magazine-sections which are not in use by any suitable means—for example, by bars R thrust transversely through slots in the magazines in position to engage below the upper ears of the matrices—or the escapement bar or frame I may be extended upward, as shown at $i^4$ in Fig. 2, to cover the ends of the magazine-sections.

Having described my invention, what I claim is—

1. A multiplex magazine, movable at its delivery end to bring one section or another into operative position, in combination with an adjacent escapement mechanism yieldingly supported, and spring connections urging the same toward the magazine.

2. A multiplex magazine, movable at the delivery end to bring one section or another into action as required, in combination with an adjacent escapement mechanism pivotally supported, and spring connections urging the same toward the magazine.

3. A multiplex magazine, movable at its delivery end to bring one section or another into operative position, in combination with an adjacent escapement mechanism, a movable support therefor, and means urging the escapement mechanism toward the magazine.

4. A multiplex magazine pivotally supported at a point remote from the delivery end, in combination with an escapement mechanism lying adjacent to the delivery end and pivotally supported, whereby it is permitted to adjust itself to the changes in the inclination of the end of the magazine.

5. A multiplex magazine pivotally supported at a point remote from the delivery end, in combination with the escapement-bar the yielding supports to which said bar is pivotally connected, and springs tending to urge said parts toward the magazine.

6. In combination, the main frame, the multiple magazine pivoted at a point remote from its delivery end, the escapement-slides, their supporting-bar, the sustaining-frame pivoted to the main frame and to the escapement-bar, and springs tending to move the escapement-bar toward the magazine.

7. In a typographic machine, a multiplex magazine movable to bring one section or another to the operative position, in combination with an independently-supported escapement mechanism, located opposite the end of the magazine and adapted to hold all of the detained matrices within the magazine, whereby the adjustment of the magazine is permitted, at will, without restoring matrices to its delivery end.

8. The channeled escapement-bar and a series of escapement-slides therein, each recessed to admit a single matrix, in combination with a magazine comprising a series of sections channeled to correspond with the escapement-bar, and means for moving the magazine to bring the required section in operative relation to the escapement mechanism.

9. The swinging magazine, the rocking escapement-bar, the escapement-slides therein, the channeled guide K, arranged to receive the matrices endwise from the escapement mechanism, and means for determining the position of the magazine in relation to the escapement devices, said parts combined for joint operation as described and shown.

10. In combination, the channeled magazine inclined to give the matrices support along their lower edges, in combination with the escapement-bar having stop-shoulders $i$ above the lower side of the magazine, and the intermediate escapement-slides H, adapted to receive the matrices from the magazine and lift the same clear of the stop-shoulders.

11. A multiple magazine and an escapement mechanism, relatively movable, that the latter may operate with either section of the magazine, said escapement constructed as shown to admit a matrix from the magazine when it is moved to an abnormal position and to release the same when restored to the normal position, whereby all of the detained matrices are kept wholly within the magazine.

12. In combination with the escapement-slide, the supporting-bar, and the actuating-lever O, having a fulcrum-point seated in the supporting-bar, substantially as described and shown.

13. In an escapement mechanism, a supporting-bar I, in combination with a series of escapement-slides, seated side by side therein, and a series of escapement-levers mounted in said bar and acting beneath the slides.

14. The escapement-slides H, their depressing-springs M', lifting-levers O, actuating-reeds P, and springs S, of strength sufficient to overcome the springs M.

15. In a linotype-machine and in combination with a movable inclined supporting-frame B, having plates or arms $b'$, the independently-removable magazine-sections having projections $e$, engaging the plates $b'$, substantially as shown.

In testimony whereof I hereunto set my hand, this 15th day of May, 1905, in the presence of two attesting witnesses.

P. T. DODGE.

Witnesses:
K. L. BRENNAN,
WALTER MOBLARD.